June 13, 1961  R. C. SINNOTT  2,988,629
COMBINATION TIMING AND CURRENT PROPORTIONER
FOR WELDING ELECTRODES
Original Filed Sept. 26, 1956  4 Sheets-Sheet 1

INVENTOR.
RICHARD C. SINNOTT
BY Townsend and Townsend
ATTORNEYS

INVENTOR.
BY RICHARD C. SINNOTT
Townsend and Townsend
ATTORNEYS

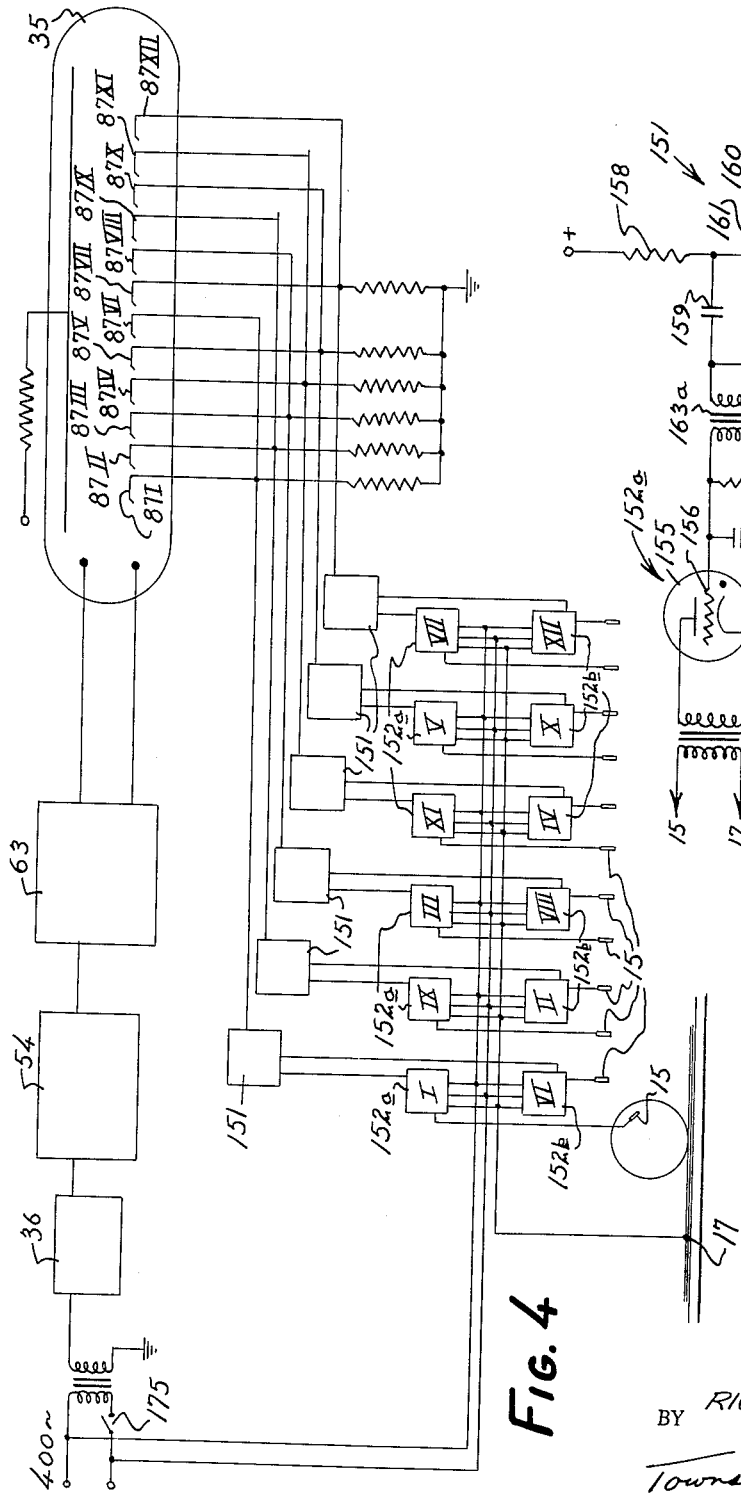
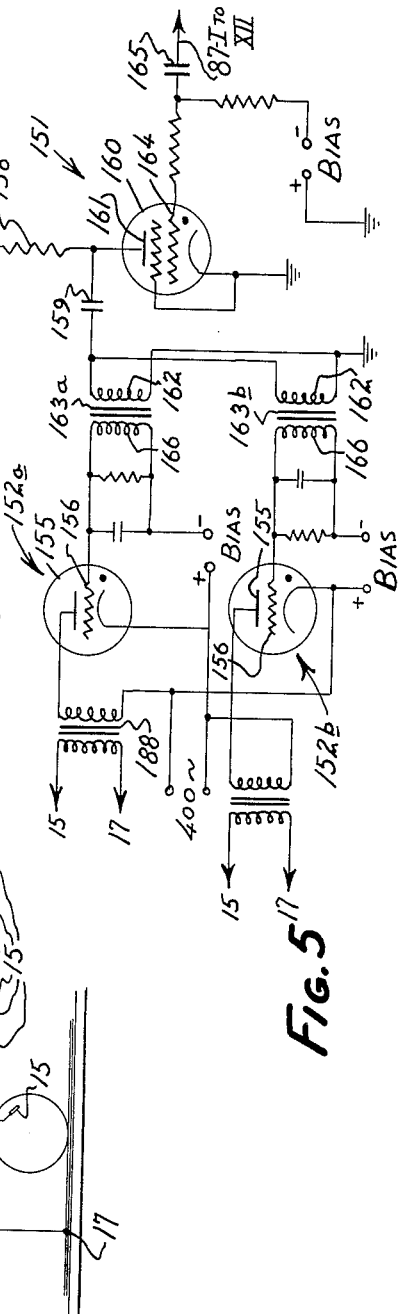
Fig. 4
Fig. 5
INVENTOR.
BY RICHARD C. SINNOTT
Townsend and Townsend
ATTORNEYS

United States Patent Office 2,988,629
Patented June 13, 1961

2,988,629
**COMBINATION TIMING AND CURRENT PROPOR-
TIONER FOR WELDING ELECTRODES**
Richard C. Sinnott, Palo Alto, Calif., assignor to Hexcel
Products Inc., Oakland, Calif., a corporation of California
Continuation of application Ser. No. 612,326, Sept. 26,
1956. This application Sept. 12, 1958, Ser. No.
761,450
15 Claims. (Cl. 219—108)

This invention relates to a resistance welding device employing a plurality of welding electrode stations and to an electric circuit for timing and proportioning welding energy to the stations. This application is a continuation of my co-pending patent application Serial No. 612,326, filed September 26, 1956, now abandoned, for Combination Timing and Current Proportioner for Welding Electrodes.

In certain industrial uses such as in making welded stainless steel honeycomb core it is desirable to make a plurality of spaced apart welded lines binding two sheets of metal together. One practical means of creating such welds is by a welding method generally referred to as resistance welding. Two sheets of a relatively high resistance metal such as stainless steel are mounted with the sheets in close electrical contact. Electrodes are placed on both sides of the two sheets and supplied with electrical current. The current when passing from one electrode to the other through the two sheets generates sufficient heat concentrated in a sufficiently small area to cause the metal to melt and effect a weld.

When a plurality of parallel rows of welds are necessary it is generally too cumbersome and time consuming to use a single pair of electrodes to make a separate pass at the work to weld each line. It is generally therefore desirable to employ a plurality of welding stations arranged to make several welded lines at one time when drawn across the work. Power consumption during welding time for a multistation welder can become prohibitive if the stations are of one electrical circuit and supplied with welding current at the same time. For this reason the electrical circuit and power supply for multiple station welders is critical.

One principal object of this invention is to provide a power supply and electronic switch for a multiple station welder which sequentially supplies each welding station with a pulse of welding current so there is at no time more than one welding station drawing welding current.

Another object of this invention is to provide the programming circuit for the welder responsive to actuate at predetermined voltage phase times of the welding current supply source.

A feature and advantage of this invention is that power supply requirements are reduced because of more efficient use of available current and the provision of each welding station with an electrically discrete welding pulse. In this device a defective electrical contact at any station will not effect the remaining stations. In circuits where a plurality of welding stations are connected in parallel, if one welding station makes a poor contact there is a greater current in the other stations which may cause a burning of the work and where the stations are serially connected a defective station will cause an open circuit rendering all stations inoperative.

The time heat relation in welding is also critical and is dependent upon the intensity and the duration of a pulse of welding energy. Too short or long a pulse or a pulse of too high or low welding energy will produce a defective weld. Therefore it is desirable to control the timing of a welding pulse.

Accordingly another object of this invention is to provide a timing and programming device for a welder which successively selects each of a plurality of welding stations at a different time and causes each said selected station to provide a pulse of welding energy which is identical in intensity and duration for each station.

A feature and advantage of this device is that both the timing of the pulse of welding energy and the programming to sequentially select the welding stations are controlled by the voltage phase of the alternating current supplying for the welding energy.

Another feature and advantage of this invention is that because the voltage phase of the welding alternating current energy conditions the timing and programming of the device, the relative timing between all components remains in a substantially identical relative time relation.

Another object and advantage of this invention is an adjustable phase shift which adjusts voltage phase to cause an electronic timer to advance in the selection of welding stations at a phase time a selected number of degrees out of phase with the welder supply source.

A feature and advantage of the adjustable phase shift control is its operation as a timing means which allows a selected portion of a half cycle of welding energy to be supplied to each welding station.

Other objects of the present invention will become apparent upon reading the following specification and referring to the accompanying drawings in which similar characters of reference represent corresponding parts in each of the several views.

Referring now to the drawings:

FIG. 4 is a block diagram of the modification of the invention.

FIG. 5 is a schematic view showing details of selected components included in the block diagram of FIG. 4.

Figure 1:
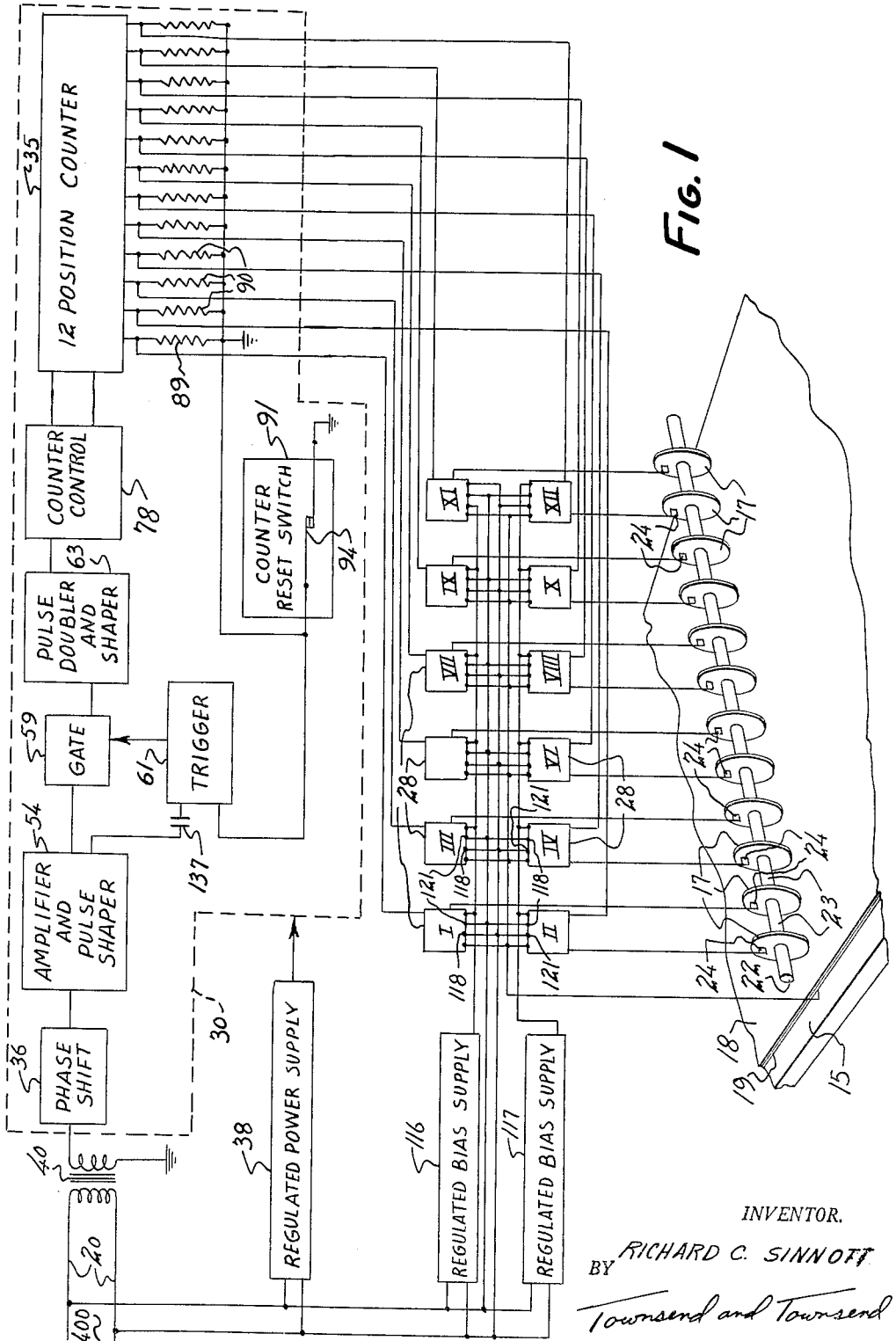
FIG. 1 is a diagram partially in block form and partially in diagrammatic form showing the preferred embodiment of the invention.

Referring now to the drawings a preferred embodiment of the invention is shown including for its welding or work area a platform or base made of a highly conductive metal to form a base or common electrode 15 for twelve electrically discrete wheel type electrodes 17. In operation, two sheets of stainless steel 18 and 19 are placed on electrode 15 and wheel electrodes 17 are caused to pass across the top of sheet 18 so the wheels make electrical contact against the stainless steel sheet 18 to sheet 19 and base electrode 15. Wheel electrodes 17 and the base electrode 15 are in this invention each at a separate predetermined time connected to a source of 400 cycle alternating current 20 so the current passes from one electrode to the other through the work thus heating the stainless steel to create a weld.

The wheels 17 are pivotally mounted on a common dielectric axle 22 and spaced from each other by dielectric spacers 23. A brush 24 forms a connecting terminal by which the wheel electrodes 17 are each separately connected to welding current supply source 20.

Each welding wheel electrode 17 has an associated gate 28 arranged to open and close to control individually the supply of welding current to each wheel 17.

Each gate 28, its associated welding wheel 17, and base electrode 15 comprises a welding station. The preferred embodiment has twelve such stations numbered for reference in sequential order by Roman numerals I to XII.

An electrical and electronic circuit 30 is arranged to open one gate of the welding stations I to XII each half cycle of an A.C. supply 20 for an identical selected part of the one-half cycle to deliver a pulse of welding energy to the electrodes of each welding station which is of substantially identical intensity and duration. Circuit 30 includes a counter 35 which advances to cause the gate opening pulses on one of twelve lines each one-half cycle of A.C. 20. Pulses derived from advances in voltage phase of alternating current 20 actuate the counter and cause it to advance one step each half cycle. A phase shift circuit 36 is employed to shift the timing of input voltage pulses to counter 35 with respect to the voltage phase of the alternating current supply 20 so that the counter can be controlled to advance at selected times with respect to the voltage phase condition of alternating current supply 20.

In greater detail the circuit 30 and gate 28 are provided with heater and B plus operating potential through a regulated power supply 38. The welding stations I through XII are furnished with welding current and the circuit 30 is supplied with control voltages from the 400 cycle alternating current supply 20.

The 400 cycle current supply 20 is coupled to circuit 30 through a coupling transformer 40, and thence to the phase shifting circuit 36. Circuit 36 has a load resistor 42 and a resistance capacity network including resistors 43 and 44, potentiometers 45 and 46 and capacitors 47 and 48 to cause an adjustable predetermined lead in the voltage phase. Potentiometers 45 and 46 have their sliders 49 connected to a common shaft to operate together to jointly introduce greater or lesser effective capacity into the circuit and cause a greater or lesser voltage lead in the control circuit. The slider 49 of potentiometer 46 connects through a grid load resistor 50 to drive a control grid 51 of an electron tube 52. The tube 52 is an amplifier and pulse shaper indicated by block 54 of FIG. 1. Tube 52 is arranged to saturate early to cut off the peaks of the sine wave input from alternating current supply source 20 to produce a substantially square wave output. The square wave output from amplifier and pulse shaper 54 is taken from plate 55 and coupled by condenser 56 to a control grid 57 of an electron tube 58 which is a gate indicated by block 59 of FIG. 1. Gate 59 is arranged to either pass or block its input signal to the next stage in accordance with the potential applied on its second control grid 60. A positive potential will pass the input signal and a negative potential will render the tube nonconductive. A trigger 61 controls the control grid potential to open or close gate 59 as will be hereinafter more fully described.

From gate 59 the square wave signal from amplifier and shaper 54 is coupled by coupling condenser 62 to a discriminator, doubler and pulse shaper stage 63 including a single triode electron tube 64 and a dual triode electron tube 65. Coupling condenser 62 connects through a load resistor 66 to a control grid 67 of tube 64 and through a diode 68 to ground. The condenser 62 also connects through a load resistor 69 to one control grid 70 of tube 65 and through a diode 71 to ground. Diode 68 is connected to pass negative current to ground, and diode 71 is arranged to pass positive current to ground so that control grid 67 will see only positive voltage pulses and control grid 70 will see only negative voltage pulses. Plate 72 of tube 64 is coupled by a coupling condenser 73 to the other control grid 74 of tube 65 to drive it with an inverted signal. The two plates 75 of tube 65 are connected together to deliver the combined output from both triode sections of the tube through a coupling condenser 76 to send 400 cycle positive pulses to a counter control circuit 78. Control circuit 78 includes a dual triode electron tube 79 with the first control grid 80 normally biased below cut-off. Control grid 80 is pulsed through condenser 76 so that upon receipt of each positive pulse the first triode section 79ª of tube 79 issues a pulse through coupling condenser 81 to counter 35 and through a coupling condenser 82 to the other control grid 83 of section 79ᵇ to cause a delayed pulse to be issued through a coupling condenser 84 to the counter 35.

Counter 35 comprises a cold cathode glow transfer gas filled counter type tube 85 such as tube type number GS12D manufactured in England by Ericsson Telephone Ltd. and distributed in the United States by Atomic Instrument Co. of Cambridge, Massachusetts, which include a common plate 86 and twelve electrically discrete cathodes 87 together with first control electrodes 88 and second control electrodes 88ª. In operation of counter tube 85, there is an area of ionization between one cathode 87 and the plate 86. Each time the first control electrodes 88 are provided with a pulse and the second control electrodes 88ª are thence after a delay also pulsed, the ionization advances in one direction to the next adjacent cathode 87 so that the counter is caused to advance each time it is subject to the proper sequence of pulses on electrodes 88 and 88ª. Counter control circuit 78 is arranged to produce the proper sequence of pulses to advance counter tube 85 each time a positive pulse is received from the doubler and pulse shaper stage 63.

One cathode 87 specifically indicated by numeral 87ª is the cathode designated as number I or starting position and is biased by a resistor 89 connected to ground. The remaining cathodes 87 are connected through resistors 90 to a reset circuit 91 to ground. The reset circuit 91 comprises a resistance-capacitor network which substantially connects the resistors 90 to ground. Circuit 91 comprises a condenser 92 connected across a low resistance value resistor 93 (in the order of 1,000 ohms) and a normally closed reset switch 94 to ground. A high value resistor 95 (in the order of 1 megohm) and a condenser 96 are provided across switch 94. With switch 94 closed all cathodes 87 are substantially near ground potential. A resistor 97, of considerably greater resistance than resistor 93, connects all cathodes except 87ª to the B plus potential so all the cathodes except 87ª become highly positive when switch 94 is open. This causes the ionized area within tube 85 to advance to the only remaining position where ionization is possible, between cathode 87ª and plate 86. This resets counter 35 to the starting or reset position. Condensers 96 and 92 together with resistors 95 and 93 of the reset circuit 91 prevent any pulses from being generated from the making or breaking of switch 94.

All cathodes 87 are connected to gates 28 of the twelve welding stations through condensers 101. Each gate 28 is controlled by a control circuit including a triode electron tube 102 which amplifies positive pulses from its associated cathode 87 of counter tube 85 while discriminating against negative pulses and chops the pulses to deliver a substantially square wave output to drive a second triode tube 103. The second tube 103 is in a cathode follower circuit and arranged to deliver a stabilized output to operate a thyratron 104 to operate the gate and cause the thyratron 104 of gate 28 to conduct welding current through a transformer 105 to the welding electrodes 15 and 17.

Discrimination of negative pulses from positive is accomplished by high bias of grid 106 and cathode 107 of tube 102 to a point substantially below cut off so only positive pulses can drive grid 106 sufficiently positive to cause tube 102 to conduct. This discrimination is necessary because pulses will be seen on control grid 106 when cathode 87 is rendered nonconductive as well as conductive. However, only the positive pulses from the associated cathode 87 of the counter going conductive is desired. Tube 102 is arranged with plate potential on its plate 108 and bias on its grid and cathode to reach an early saturization so there is a squaring of the output sine wave to impose a sharp signal upon the control grid 109 of tube 103. A cathode 110 of tube 103 is loaded with a load resistor 111 and is coupled by a coupling condenser 112 to a resistor 113 and thence to a control grid 114 of thyratron 104. The condenser side of resistor 113 is provided with a negative bias potential through a resistor 115 from one of two separate bias supply 116 or 117 and a cathode 118 of thyratron 104, is connected to the positive terminal of its associated bias supply.

In the gate 28 the 400 cycle alternating current supply 20 is connected through a primary winding 121 of transformer 105 to plate 108 and cathode 118 and the secondary 122 to transformer 105 is connected to the two welding electrodes 17 and 15.

Each half cycle when counter 35 advances a position, a pulse is issued to render the grid 114 of thyratron 104 sufficiently positive to cause the thyratron to conduct during the phase time when its plate 108 is positive. The pulses from the counter are much shorter in duration than a half cycle of the alternating current source 20. However, the pulse fires the thyratron and once fired the thyratron will remain conductive until plate 108 shifts to the negative. Each welding station will therefore see welding energy from the instant the thyratron 104 is pulsed until the alternating current supply 20 changes polarity.

In as much as the counter 35 advances every half cycle of alternating current supply 20 the plates 108 of the thyratron 104 of adjacent stations are connected 180° out of phase with each other. Thus the even numbered stages II, IV, VI, VIII, X and XII are connected 180° out of phase with the odd stages I, III, V, VII, IX and XI. The odd stages are provided with a separate bias source from bias supply 116 and the even numbered stations are provided with a bias supply from separate bias supply 117 to prevent back circuit shorts.

The counter 35 is given a sense of timing with respect to phase relationship of positive potential to the plates of thyratrons by gate 59 under the control of trigger 61. The trigger 61 is operated by reset circuit 91 so gate 59 will close when the reset switch 94 is opened. In this condition the counter is reset to the number I position with ionization between plate 86 and cathode 87$^a$. When gate 59 is again closed it can be seen that the next pulse through the gate 59 will cause the counter to advance to the cathode 87 connected to welding station number II. It is necessary, therefore, that the gate 59 open and the first pulse to the counter come at a time in correct phase relationship to provide a positive plate potential on plate 108 of thyratron 104 of the gate 28 of welding station II. To effectuate this timing trigger 61 retains gate 59 in a closed condition until a pulse of negative polarity is received by trigger 61 thus affecting the proper phase timing relationship between the counter and the input supply alternating current 20.

The trigger 61 in greater detail includes a dual triode tube 125 having a first section 125$^a$ and a second section 125$^b$ in a bi-stable multi-vibrator or flip flop circuit. Both cathodes 126 of tube 125 are connected through a bias resistor 127 and condenser 128 to ground and a control grid 133$^a$ of section 125$^a$ is coupled by a resistor 130 and a condenser 131 to a plate 132$^b$ of the section 125$^b$.

The other grid 133$^b$ of the section 125$^b$ is connected through a resistor 134 and a condenser 135, of identical values to resistor 130 and condenser 131, to a plate 132$^a$ of section 125$^a$. Grid 133$^a$ is biased to ground by a resistor 136 while the grid 133 of section 125$^b$ is biased by a resistor 137 and condenser 138 through reset circuit 91 to ground. When switch 94 closes, section 125$^a$ of trigger 61 is in a stable conductive condition. With switch 94 open, grid 133$^b$ becomes so highly positive that section 125$^b$ is immediately rendered conductive. Then when the switch is again closed, section 125$^b$ remains conductive until pulsed with a negative pulse. A condenser 138 is attached to grid 133$^b$ and plate 55 of tube 52 to transmit pulses from amplifier and pulse shaper 54 to the grid 133$^b$ of the trigger. A positive pulse from condenser 138 will do nothing while a negative pulse from throw grid 133$^b$ sufficiently negative to cause the trigger 61 to flip rendering section 125$^a$ conductive. After the trigger has flipped with section 125$^a$ conductive, further negative or positive pulses on grid 133$^a$ will be ineffective to cause a change. Screen grid 60 of gate 59 is connected to plate 132$^a$ of the multivibrator or trigger 61 so that when section 125$^b$ is conductive, screen grid 60 is rendered sufficiently negative to cause tube 58 to be nonconductive. The tube will regain conductivity only upon the section 125$^a$ becoming conductive and section 125$^b$ becoming nonconductive whereby screen grid 60 is then able to rise to a sufficiently positive potential to open the gate.

It can be seen with switch 94 open that the electrical and electronic circuit 30 will not operate. When switch 94 is closed counter 35 is conditioned to advance when pulsed. However, trigger 61 maintains gate 59 closed until a negative pulse is received from amplifier and pulse shaper 54. At the instance of the first negative pulse gate 59 is opened and the first negative pulse is caused to pass through the gate to energize stage 63 and produce a positive pulse to cause the counter to advance from the starting first position to the cathode 87 controlling the second welding station's gate 28 which causes the gate to open to supply the welding electrodes 15 and 17 of station II with current. Plate 108 of thyratron 104 of the second welding station is positive when pulsed and remains fired throughout the remainder of the half cycle of alternating current 20 until the plate potential drops to a low or negative value. When the potential drops to a low or negative value the phase change causes a pulse which ultimately causes the counter 35 to advance to issue a pulse to the gate 28 of welding station III and likewise the third welding station is rendered operative through the remainder of the half cycle of welding current 20.

Phase shift 36 can be adjusted to vary the voltage phase of circuit 30 with respect to the current and voltage phase at the welding stations. By this means the counter can be adjusted with respect to the welding stations alternating current supply, to advance at a select welding station voltage phase time.

It can be seen that by adjustment of slides 49 the time that the counter will advance can be regulated with respect to the voltage phase time at the thyratron 104. Control of phase shift 36 thus moves the voltage pulse to the counter 10° to 135° so the thyratrons firing pulse will occur at selected times for the welding electrode within 10° to 135° phase variation and thus enable the welding station to see a selected part of a half cycle of welding energy for current source 20.

By this adjustment of substantially the entire half cycle, only the last portion may be selected.

It is important that the adjustment afforded by circuit 36 insures that each welding station will see an exactly identical portion of a half cycle.

This control is effective where it is desirable to use selectively either the rise, the fall or both the rise and fall of welding current.

Figure 2:
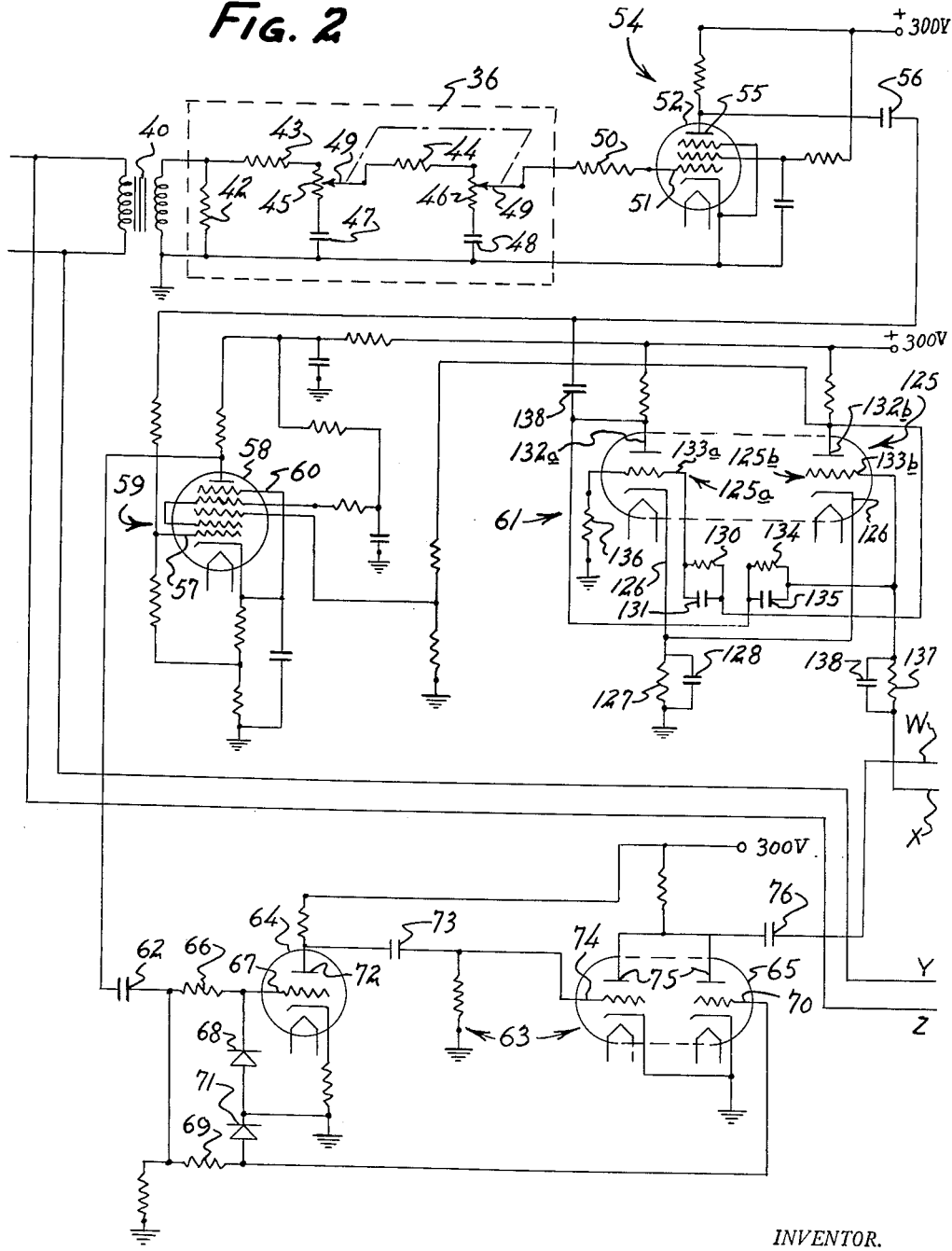
FIGS. 2 and 3 are together a schematic diagram showing in detail the electrical circuitry embodied in block form in FIG. 1.
Figure 3:
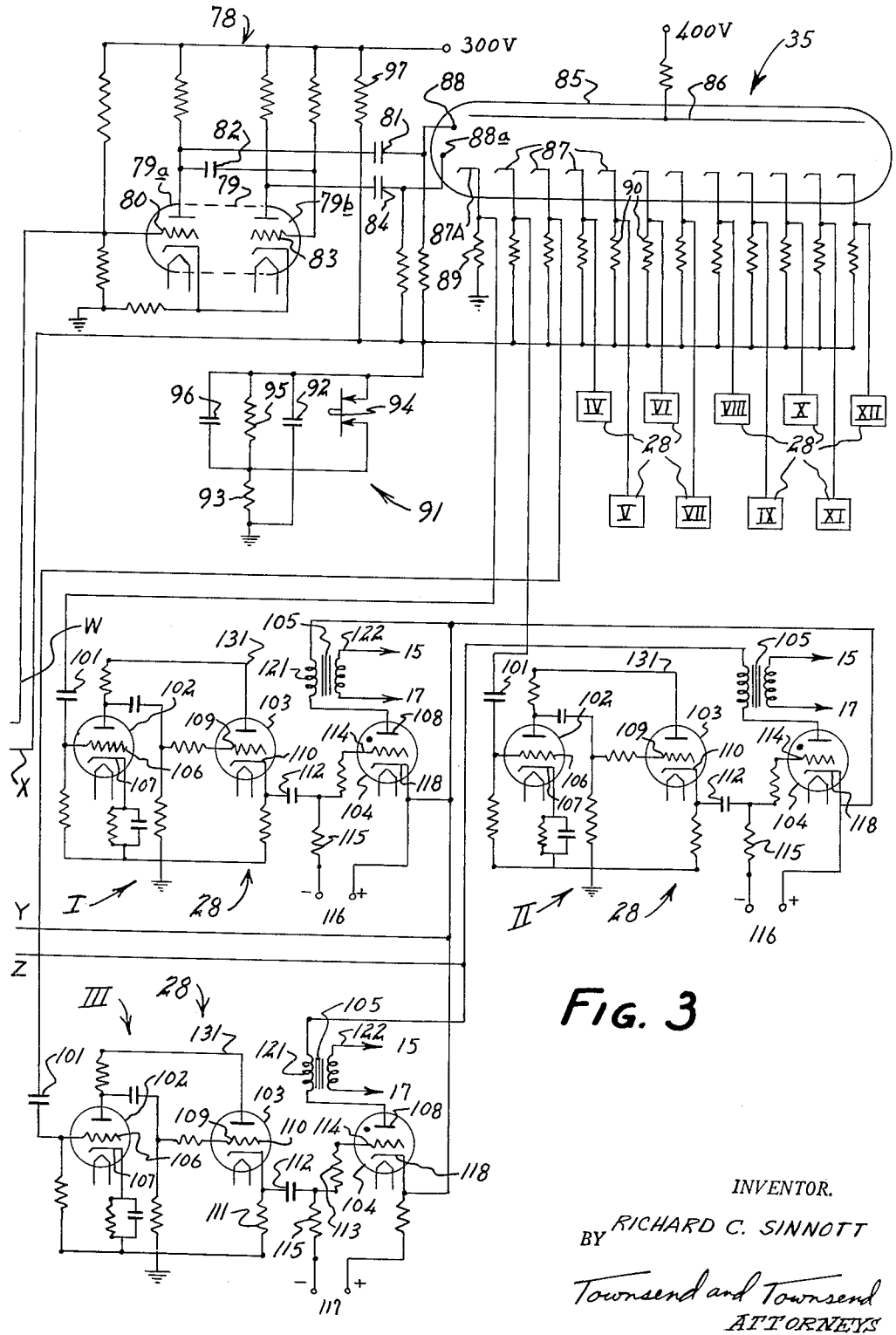

Referring now to FIG. 4 and FIG. 5 there is shown a modification of the embodiment hereinbefore set out in detail with reference to FIGS. 1, 2 and 3 which bears identical reference numerals thereto where both circuits are identical. In FIG. 4 as in FIGS. 1, 2, and 3 there is provided a phase shift 36, and an amplifier and pulse shaper 54. The output from amplifier and pulse shaper 54, however, is applied directly to pulse doubler and shaper 63. The gate 59 as shown in FIGS. 1, 2 and 3 and the trigger 61 controlling gate 59 have been deleted.

The pulse shaper 63 drives counter control circuit 78 which operates a twelve positioned counter 35. The above described circuit with the exception of certain modifications of the cathode connections to the counter 35, the stop start control, and the elimination of the gate 59, as will be hereinafter described, is identical to the circuit as described in connection with FIGS. 1, 2 and 3. The cathodes are designated as 87I to 87XII. It is noted that in the embodiment of FIGS. 1, 2 and 3 the gate 59 and the trigger 61 provide the counter with a sense of timing so that counter 35 would advance to distribute pulses to actuate the respective welding stations I to XII at a time when the plates 108 of the thyratron 104 of the welding station were at positive potential. The timing was necessary because the counter advanced each half cycle and without such timing a thyratron 104 could be pulsed while the plate 108 was negative.

In the modified circuit of FIG. 4 there is provided a welding station timer 151 to control two welding stations 152a and 152b. The welding stations are numbered I to XII and each comprising a welding station gate 152a or 152b each gate having a thyratron 155 which energizes welding electrodes 15 and 17. Each welding timer 151 is arranged to issue a pulse to the control grid 156 of the thyratron of the two gates 152a and 152b upon being pulsed by one of two of the twelve cathodes 87 of the counter 35. The cathodes 87I to XII for the respective welding stations are connected together to energize the welding station as follows:

Cathodes number 87I and 87VI drive welding stations I and VI;

Cathodes number 87II and 87IX drive welding stations II and IX;

Cathodes number 87III and 87VIII drive welding stations III and VIII;

Cathodes number 87IV and 87X drive welding stations IX and X;

Cathodes number 87VII and 87XII drive welding stations VII and XII.

Each welding timing circuit 151 thence controls one gate 152b in the even numbered welding stations, and one gate 152a in the odd numbered welding stations. The odd numbered welding station gates 152a are arranged with their thyratrons 155 connected 180° out of phase with the even numbered gates 152b so that when the thyratron 155 of the gate 152a is positive thyratron 155 of gate 152b is negative. Thus at any given instant when grid 156 is pulsed only one of the thyratrons 155 will fire. Thus by this expedient whenever counter 35 is actuated to advance from one cathode to the next a pulse is generated to a welding timer 151 which causes a pulse to be issued to its two associated gates 152a and 152b, and as only one of the thyratrons 155 is positive only one of the thyratrons will fire. As hereinbefore described counter 35 is arranged to advance each half cycle of alternating current 20. The two cathodes arranged to control each welding timer 151 are a sufficient number of cathodes 87I to XII apart so that one of the cathodes will energize the welding timer circuit 151 during one phase condition wherein the voltage at the gate are at one polarity and the other cathode will energize the same welding timer circuit during another phase condition wherein the voltage at the gate is of the reverse polarity. The cathodes energizing each welding timer, however, are not adjacent one another, as the welding timing circuits each comprises a sensitive low powered thyratron 160 such as the type 2D21 which is arranged to discharge a condenser 159, previously charged through a resistance 158, upon being fired. The cathodes energizing each timer circuit 151 are more than one cathode apart to allow sufficient time for condenser 159 to recharge between thyratron 160 firing. The control grid 164 of thyratron 160 is connected to respective cathodes 87I through XII through condenser 165. The plate 161 of thyratron 160 provides an output pulse when fired by discharge condenser 159 through two peaking transformers 163a and 163b. The two transformers 163a and 163b are of the type having a core capable of substantially immediate saturation upon being energized. The fast saturization is obtained by the core material being composed of metal with an hysteresis curve which allows for rapid magnetic change. The effect of such a rapid saturation is to produce an extremely sharp pulse at the secondary 166 of the transformers 163a and 163b when the transformer primary 162 is energized.

The secondary 166 of transformer 163a is arranged to energize gate 152a and the secondary transformer 163b is arranged to energize gate 152b.

When the control grid 164 is pulsed thyratron 160 immediately fires thus rendering the tube conductive. Condenser 159 then rapidly discharges through the tube and through the primaries 162 of the transformers 163a and 163b. The plate potential on plate 161 is derived through plate load resistance 158. The resistance 158 is sufficiently high (in the order of 200,000 ohms or greater) so that upon the discharge of condenser 159 the plate 161 is effectively brought to a sufficiently low voltage so that the tube is reset. Thus resistance 158 will not allow plate 151 to recover fast enough after the discharge of condenser 159 to allow the thyratron 160 to remain conductive. The pulse to the control grid 164 of thyratron 160 is of sufficiently short duration so by the time condenser 159 is discharged the grid 164 is again at bias potential.

The counter 35 is controlled by a control switch 175 which substantially interrupts control voltage to the counter when opened and there renders the counter inoperative.

In operation of the device while switch 175 is closed the ionization advances from one cathode to an adjacent cathode each half cycle. It is noted that in the modification of FIGS. 4 and 5 the counter is not reset but only frozen upon opening switch 175. Then when the switch is again closed the counter starts operating from the cathode ionized at the time switch 175 was previously opened.

It can be seen that the instant control switch 175 is closed one welding timer 151 is energized and one of the thyratrons 155 of the timer's two associated gates 152a and 152b is caused to fire. Thus the welding energy from alternating current 20 is disseminated between the twelve welding stations in sequence so that during each half cycle of current source 20 one welding station is energized with welding energy which is used to actuate the welding electrodes through output transformer 188.

Although the foregoing invention has been described in some detail by way of illustration and example for purposes of clarity of understanding, it is understood that certain changes and modifications may be practiced within the spirit of the invention as limited only by the scope of the appended claims.

It is claimed:

1. In a resistance welder the combination of: a plurality of welding stations, each welding station including at least one pair of welding electrodes and a gate, control means for said welding stations to selectively energize said gates, alternating current supply means to supply welding energy for said electrodes and having a voltage component to actuate said control means, each said gate responsive to open to supply welding energy to electrodes associated with said gate during a selected voltage phase time of said supply voltage upon being energized by said control means, and said control means including a counter operable to pulse said gates in a predetermined sequence at predetermined voltage phase times of said supply means.

2. In a resistance welder the combination of: a plurality of welding stations, each station including at least one pair of welding electrodes and a gate, control means for said gates, alternating electrical power supply means to supply welding energy for said electrodes and control voltage to actuate said control means, each said gate operative to open to supply welding energy to its associated electrodes for a predetermined voltage phase time of said supply energy upon being pulsed by said control means, said control means including a counter operable to advance to a plurality of stages to pulse selected said gates at selected stages, and timing means to cause said counter to advance from one stage to another upon the control voltage reaching a predetermined phase condition.

3. A resistance welder comprising the combination of claim 2 and wherein said timing means comprises: phase adjusting means to adjustably vary the phase of the control voltage for said control means with reference to the control voltage of said alternating current power supply means.

4. In a resistance welder the combination of a plurality of welding stations, each said welding station including at least one pair of welding electrodes and a gate arranged to supply said welding electrodes with welding energy from a source of alternating current when the gate is actuated, control means arranged to energize each gate at a different selected phase time of the alternating current with each said selected phase time occurring at an identical voltage phase condition with respect to the alternating current welding energy supply, and each said gate including means to render said gate inoperative at a second selected phase condition of the alternating current welding energy supply, whereby said gates are successively rendered operative upon being energized by said control means for a predetermined cyclic interval with reference to said alternating current welding energy supply means.

5. In a resistance welder the combination of a plurality of welding stations, each said welding station including at least one pair of welding electrodes and a gate arranged to supply said welding electrodes with welding energy from a source of alternating current when the gate is actuated, control means arranged to energize each gate at a different selected phase time of the alternating current with each said selected phase time occurring at a selected voltage phase condition with respect to the alternating current welding energy supply, and each said gate including means to render said gate inoperative at a second selected phase condition of the alternating current welding energy supply, whereby said gates are successively rendered operative upon being energized by said control means for a predetermined cyclic interval with reference to said alternating current welding energy supply means.

6. In a resistance welder the combination of a plurality of welding stations, each welding station including at least one pair of welding electrodes and a gate responsive to open when energized to supply said welding electrodes with welding energy from a welding energy alternating current supply, a counter operative to momentarily energize one said gate when said counter advances one position, means to advance said counter one position each half cycle of the alternating current of welding energy supply current, and means to retain an energized gate in energized condition for a predetermined phase time of welding energy supply current.

7. In a resistance welder the combination of a plurality of welding stations, each welding station including a gate and at least one pair of welding electrodes, each said gate normally closed and responsive to open to supply the welding electrodes with welding energy from a welding energy alternating current supply during the remainder of a selected half cycle phase time of the alternating current supply after being energized by a gate actuating pulse, a counter operative to advance to one of a selected plurality of positions each half cycle of the welding energy supply, and said counter arranged to produce a gate actuating pulse to actuate a selected gate upon the counter advancing to each one of the selected positions.

8. In a resistance welder the combination of a plurality of welding stations, each welding station including at least one pair of welding electrodes and a gate operable to open to supply welding energy from an alternating current supply source to said electrodes, counter means operable to advance to a selected one of a plurality of positions at selected phase times of the alternating current, said counter means arranged to pulse at least one pair of welding electrodes and a gate operable to open to supply welding energy from an alternating current supply source to said electrodes, counter means operable to advance to a selected one of a plurality of positions at selected phase times of the alternating current, said counter means arranged to pulse at least one selected gate upon the counter advancing to each said position, and the said gate operable to open upon being pulsed by said counter during a selected half cycle of the alternating current supply source and operable to close when the alternating current reaches a predetermined phase condition.

9. In a resistance welder the combination of a plurality of welding stations, each welding station including at least one pair of welding electrodes and a gate operable to open to supply welding energy from an alternating current supply source to said electrodes, counter means operable to advance to a selected one of a plurality of positions at selected phase times of each half cycle of the alternating current supply, said counter arranged to pulse at least one selected gate upon the counter advancing to each said position, each said gate operable to open upon being pulsed by said counter during a selected half cycle, and closed at the end of the selected half cycle.

10. A resistance welder according to claim 9 and wherein said counter is provided with counter timing means to program the advance of the counter to time pulses for each gate to occur during the selected half cycle at which said gate is operative to open when pulsed by said counter.

11. In a resistance welder the combination of a plurality of welding stations, each welding station including at least one pair of welding electrodes and a gate operable to open to supply welding energy from an alternating current supply source to said electrodes, counter means operable to advance to a selected one of a plurality of positions at selected phase times of each half cycle of the alternating current supply, said counter arranged to pulse at least two selected gates upon the counter advancing to each of said positions, each said gate operable to open upon being pulsed by said counter during a selected half cycle of alternating current, two of the gates pulsed by said counter advancing to each position being operative to open at selected half cycles 180° apposed to each other, and all said gates operative to close at the end of each half cycle.

12. In a resistance welder the combination of a plurality of welding stations, each welding station including at least one pair of welding electrodes and a gate responsive to open to supply alternating current welding energy to said electrodes upon being energized, control means to sequentially energize one said gate each half cycle of the alternating current welding energy, each said gate responsive to close at a predetermined phase time of the welding energy alternating current, and timing means to cause said control means to actuate each said gate at a phase time a selected predetermined number of degrees from the phase time said gate is closed.

13. In a resistance welder the combination of a plurality of welding stations, each welding station including at least one pair of welding electrodes and a gate responsive to open to supply alternating current welding energy to said electrodes upon said gate being actuated, control means to energize two selected said gates each half cycle of the alternating current welding energy, one of said selected two gates responsive to open upon being energized by said control means during one half cycle of the alternating current welding energy, and the other selected said gate responsive to open upon being energized by said control means during the other half cycle of alternating current welding energy, the first and second half cycles being 180° out of phase with each other, whereby one of the two selected gates is opened upon the two selected gates being energized by said control means.

14. A resistance welder operative from a source of alternating current welding energy comprising: counter means, counter actuating means to control the counter, first and second thyratron gate means controlled by said counter, welding electrodes individually associated with each said gate means and energized by alternating current welding energy passing through said thyratron gate means, said counter means operable to advance sequentially to selected positions to produce pulses to energize selected first and second said gate means alternately, said counter actuating means controlled by the alternating current welding energy and arranged to cause said counter to advance one position each half cycle of the alternating current welding energy at a predetermined phase time, said first gate means arranged to open to supply welding energy to associated electrodes upon being energized by said counter means during one of the half cycle phases of the alternating current welding energy and said second selected gate means arranged to supply welding energy to associated electrodes upon being energized by said counter means during the other half cycle phase of the alternating current welding energy, all said gates arranged to close at the end of each half cycle phase of the said alternating current welding energy, and means to time the advance of said counter at half cycle phase times of the alternating current welding energy to energize said first and said second gate means at particular half cycle phase times when the energized gate is conditioned to open when energized.

15. A resistance welder operative from a source of alternating current welding energy comprising: counter means, counter actuating means to control the counter, first and second thyratron gate means controlled by said counter, and welding electrodes individually associated with each said gate means and energized by alternating current welding energy passing through said gate means, said counter actuating means controlled by the alternating current welding energy and arranged to cause said counter to advance sequentially to one of a plurality of counter positions each half cycle of the alternating current welding energy at a predetermined phase time, said counter means operable to produce a pulse to simultaneously energize a selected pair of first and second gate means, each selected pair of gate means arranged to be energized when the counter is advanced to either of a selected two counter positions, said counter arranged to advance to the selected two positions at opposite half cycle phases of the alternating current welding energy, said first gate means arranged to open to supply welding energy to associated electrodes upon being energized during one selected half cycle phase of the alternating current welding energy, and said second gate means arranged to supply welding energy to associated electrodes upon being energized by said counter means during the other half cycle phase of alternating current welding energy, all said gates operable to close at the end of each half cycle phase alternating current welding energy.

References Cited in the file of this patent
UNITED STATES PATENTS

| | | |
|---|---|---|
| 2,039,851 | Silverman | May 5, 1936 |
| 2,066,929 | Dawson | Jan. 5, 1937 |
| 2,210,710 | Diamond | Aug. 6, 1940 |
| 2,508,145 | Daniels et al. | May 16, 1950 |